INVENTOR.
Bingham Y. K. Pan

United States Patent Office 3,371,989
Patented Mar. 5, 1968

3,371,989
CATALYST ACTIVATION
Bingham Y. K. Pan, Texas City, Tex., assignor to Monsanto Company, St. Louis, Mo., a corporation of Delaware
Filed Nov. 22, 1963, Ser. No. 325,584
3 Claims. (Cl. 23—151)

ABSTRACT OF THE DISCLOSURE

An improvement in the process for the production of hydrogen cyanide by the vapor-phase reaction of ammonia, natural gas and air in the presence of a platinum gauze catalyst which comprises activating the catalyst by passing the reactants in specified mole ratios and temperatures through it at a specific mass flow rate in the range from 1.28 to 1.45 lb./hr./layer of gauze/sq. in. of gauze surface until a maximum yield of hydrogen cyanide is obtained.

Figure 1:
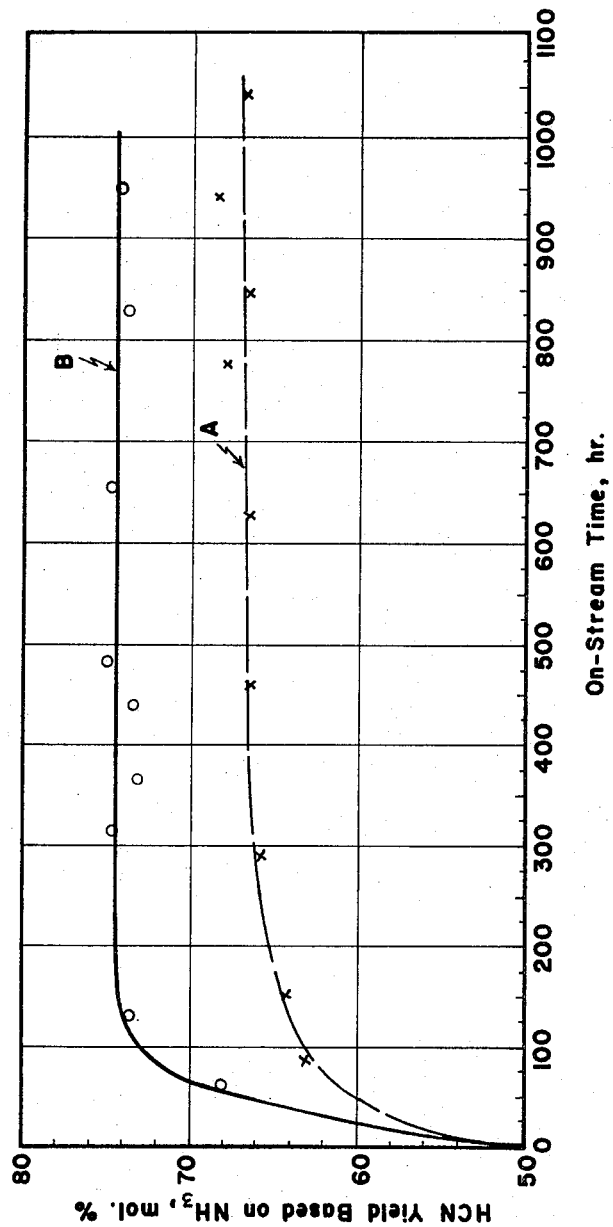

The present invention relates to an improved process for the synthesis of hydrogen cyanide. More particularly, it relates to the activation of platinum-containing gauze catalysts employed in the production of hydrogen cyanide by the reaction of a nitrogen-containing gas, a hydrocarbon, and an oxygen-containing gas.

Among the methods presently known for the preparation of hydrogen cyanide, the more widely accepted are those in which a nitrogen-containing gas, a hydrocarbon, and an oxygen-containing gas are reacted in the presence of a catalyst. Of these, the commercial process offering the most advantages is that in which the reactants are ammonia, natural gas, and air. The catalyst generally employed in this process is comprised of some form of platinum or its alloys. A catalyst having many superior qualities is one consisting of fine gauze woven from wire made from platinum containing from 2 to 50% rhodium and usually about 10% rhodium. Various techniques for installation of the gauze catalyst in the reactor have been developed such as the use of one or more layers of flat pieces of gauze, flat gauzes supported on grids, cylindrical-type gauzes, multi-layered conical structures of gauze, and the like.

In the reaction of ammonia, natural gas, and air over all such gauze catalysts, there is a period of time after the reaction is initiated with a new gauze catalyst before maximum catalytic activity is achieved. This catalyst-maturing or activation period varies in length or duration and may last as long as twelve days. During the activation period, the conversion of reactants to hydrogen cyanide is lower than optimum and the yield slowly increases to the normal optimum. The lowered conversion and yield in a plant-scale operation during this period represent significant losses in utilization of raw materials as well as loss in production output. It has now been discovered, however, that the conversion of raw materials to hydrogen cyanide and the yield of this product can be significantly increased, the life of the catalyst can be lengthened, and the time required for activation of the catalyst can be shortened considerably by controlling the specific mass flow rate of the reactant mixture through the reactor during the activation period at a particular level.

According to the invention, therefore, there is provided an improved process for the production of hydrogen cyanide by the reaction of ammonia, natural gas, and air over a platinum metal or platinum alloy gauze catalyst at elevated temperatures which comprises subjecting said gauze catalyst when new or fresh to an activation step which consists of passing a reactant mixture of ammonia, natural gas, and air in such proportions that the mole ratio of ammonia to natural gas is in the range from 0.70 to 1.0 and the mole ratio of natural gas to air is in the range from 0.170 to 0.200 through said gauze catalyst at a specific mass flow rate in the range of 1.28 to 1.45 lb./hr./layer of gauze/sq. in. of gauze surface at a temperature in the range from about 1100° C. to about 1200° C. for the period of time required to give a maximum yield of hydrogen cyanide and thereafter passing a reactant mixture of ammonia, natural gas, and air through said catalyst under conditions known to give hydrogen cyanide.

The invention is illustrated in the following examples which, however, are not to be construed as limiting it in any manner whatsoever.

Example 1

A new or fresh catalyst comprising three packs of wire gauze each consisting of three layers of gauze made of a platinum-rhodium alloy containing 90% platinum and 10% rhodium was mounted with suitable supports in a conventional reactor or converter for the production of hydrogen cyanide (HCN). A reactant mixture comprising ammonia, natural gas, and air in proportions such that the mole ratio of ammonia to natural gas was about 0.849 and the mole ratio of natural gas to air was about 0.183 was passed through the nine-layer gauze catalyst maintained at a temperature of 1100° to 1150° C. at specific mass flow rates in the range from about 0.76 to about 1.14 lb./hr./layer of gauze/sq. in. of gauze surface for about 450 hrs. Thereafter for the remainder of a 1000-hr. reaction period, specific mass flow rates varied from a low of 0.91 lb./hr./layer of gauze/sq. in. of gauze surface to a high of 1.58 lb./hr./layer of gauze/sq. in. of gauze surface. Yields were determined at spaced intervals of time by sampling the effluent gas from the converter and analyzing the samples for HCN and ammonia. From the analytical results obtained, the yields of HCN and the conversion of ammonia to HCN were calculated. These data are expressed graphically in the curves designated by the letter A in the accompanying FIGURES 1 and 2, respectively.

Example 2

The gauze catalyst of Example 1 was replaced by an identical new catalyst consisting of three packs of three layers each of gauze which was suitably mounted in the HCN reactor. The procedure of Example 1 was repeated using the same proportions of reactants except that the reactants were passed over the catalyst in the reactor at a specific mass flow rate in the range from about 1.30 to about 1.35 lb./hr./layer of gauze/sq. in. of gauze surface until the maximum yield of HCN was attained as determined by analysis of the product gases. Thereafter the reactor was operated with the same reactant ratios but at specific mass flow rates in the range from about 0.76 lb./hr./layer of gauze/sq. in. of gauze surface to about 1.58 lb./hr./layer of gauze/sq. in. of gauze surface until the total reaction period was approximately 1000 hours. The yields and conversions obtained in this run are expressed graphically in the curves designated by the letter B in both FIGURES 1 and 2.

Figure 2:
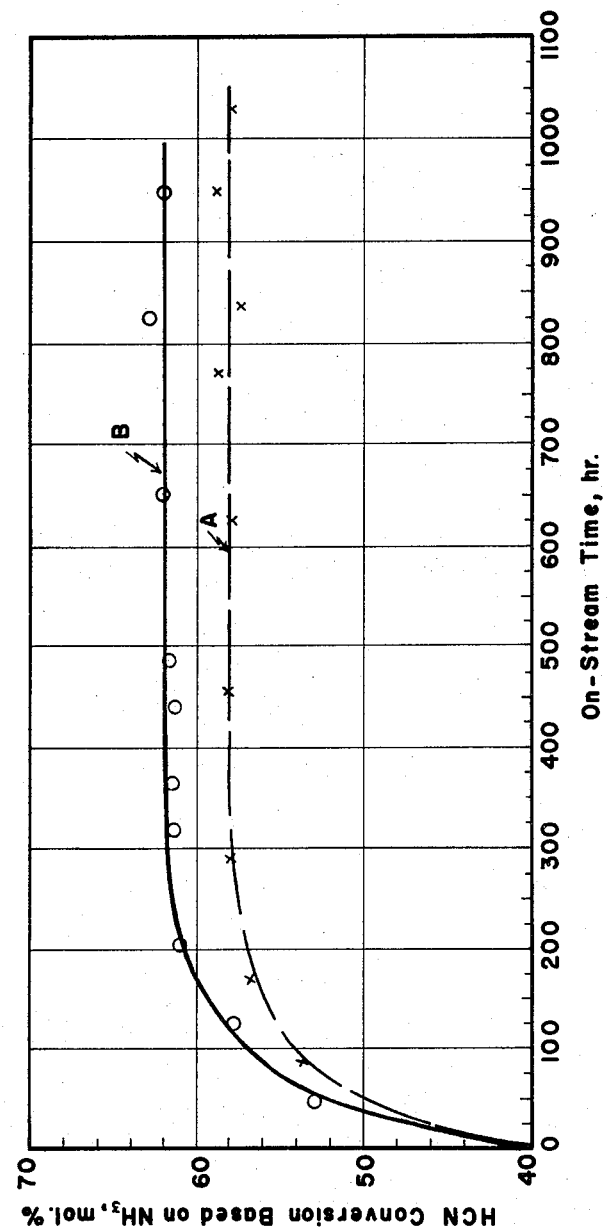

A comparison of the curves in FIGURE 1 will show that the activation period using the specific mass flow rates of the invention requires only about 115 hours whereas with lower specific mass flow rates which are of the order of those conventionally used, the activation period requires about 350 hours. This decrease in the length of the activation period results in a substantial economy in raw materials required. More importantly, both higher yield and conversion levels are obtained using the activation process of the invention. It is immediately obvious from consideration of the curves in FIGURE 1 that an increase in yield of about 7.5% is obtained when the gauze catalyst is activated at the higher specific mass flow rates of the present invention than when it is activated at the rates conventionally employed. FIGURE 2 shows clearly, too, that activation of the catalyst according to the present invention results in an increase of about 4% in conversion of ammonia to HCN.

*Example 3*

The procedure of Example 2 was repeated with another new gauze catalyst identical to that used in that example. The activation was effected using the same reactant ratios employed in Example 2 but using a specific mass flow rate of 1.33 lb./hr./layer of gauze/sq. in. of gauze surface until maximum HCN yield was attained. Thereafter, specific mass flow rates were varied from about 1.10 to about 1.50 lb./hr./layer of gauze/sq. in. of gauze surface according to HCN product demand. Peak performance of the catalyst was attained at about 100 hours with a yield of 77.31% and a conversion of ammonia to HCN of 65.1%. Average yield over a period of 3,000 hours of operation was 74.5% while average conversion of ammonia to HCN over this period was 60%. Prior to the discovery of the activation technique of the invention, the average period of time required for activation of the gauze catalyst was about 275 hours, the average best HCN yield was 69.8%, and the average best conversion was about 58% with a catalyst having an average life of about 2,000 hours.

The benefits of the catalyst activation technique of the invention are not restricted to any particular set of reactant ratios, temperatures, number of gauzes in the catalyst, or throughput of reactants for the production of HCN from ammonia, natural gas, and air. Once the catalyst is activated, it can be used to produce HCN employing any of a wide variety of conditions. The proportions of reactants, for example, are not critical but for satisfactory operation are preferably held within certain limits. The ratio of natural gas and ammonia may be varied within comparatively wide limits. In order to make the reaction exothermic, the quantity of oxygen employed must amount to about 10% by volume of the sum of ammonia and natural gas but it must be less than the amount which would lead to the complete combustion of the ammonia and hydrocarbon to water, carbon dioxide, and nitrogen. Good yields are obtained using natural gas with an amount of oxygen, the ratio of which to the sum of ammonia and natural gas is less than one. In general, mole ratios of ammonia to natural gas from about 0.7:1 to about 1.2:1 are used and mole ratios of natural gas to air of about 1:5 to about 1:7.5 are employed. In the preferred embodiment of the invention, mole ratios of ammonia to natural gas from about 0.7:1 to about 0.9:1 are used in conjunction with mole ratios of natural gas to air from 1:5 to about 1:6. Optimum conditions depend upon the exact nature of the catalyst used, the time of contact of the gaseous mixture with the catalyst, and the composition and nature of the feed gases.

The temperature at which the reaction is conducted can vary between 500° and 1300° C. but preferably it is maintained between 900° and 1200° C. The reaction is initiated by heating either the reactant gases or the catalyst to reaction temperature or by igniting the gaseous mixture by means of a flame, electric heating wire, or the like.

The process may be carried out at any pressure, i.e., at atmospheric, superatmospheric, or reduced pressure, but generally about atmospheric pressure is preferred with gauze catalysts because of their sensitivity to physical damage.

Specific mass flow rates in the reaction may be varied to suit production demands except, of course, in the catalyst activation stage of the reaction where the control of this variable within the specified limits constitutes the essence of the present invention. Any specific mass flow rate from about 0.50 to about 1.70 lb./hr./layer of gauze/sq. in. of gauze surface is suitable. Generally, those in the range from about 0.70 to about 1.50 lb./hr./layer of gauze/sq. in. of gauze surface are preferred.

With an efficient catalyst, the contact time may be extremely short, e.g., less than about 0.001 second. Generally, contact times from 0.001 to about 0.002 second at reaction temperatures are employed.

As mentioned previously, suitable catalysts are those containing platinum and preferably those containing platinum in conjunction with another noble metal such as iridium, palladium, and especially rhodium. Preferred alloys are those containing 80–90% platinum and, correspondingly, 20–10% rhodium. Especially preferred is an alloy containing 90% platinum and 10% rhodium. The catalyst is preferably employed in the form of a gauze and the gauze structure may be varied as desired.

What is claimed is:

1. In a process for the production of hydrogen cyanide by the vapor-phase reaction of ammonia, natural gas, and air in the presence of a platinum gauze catalyst, the improvement which comprises activating said catalyst by passing a reactant mixture of ammonia, natural gas, and air in such proportions that the mole ratio of ammonia to natural gas is in the range from 0.7 to 1.0 and the mole ratio of natural gas to air is in the range from 0.170 to about 0.200 through said catalyst at temperatures from about 1100° C. to about 1200° C. at a specific mass flow rate in the range from about 1.28 to about 1.45 lb./hr./layer of gauze/sq. in. of gauze surface for a period of time required to give a maximum yield of hydrogen cyanide.

2. The process of claim 1 wherein said mole ratio of ammonia to natural gas is about 0.849 and said mole ratio of natural gas to air is about 0.183.

3. The process of claim 2 wherein said platinum gauze catalyst is one containing 90% platinum and 10% rhodium.

References Cited

UNITED STATES PATENTS 3,244,479   4/1966   Pan et al. _____ 23—151

OSCAR R. VERTIZ, *Primary Examiner.*

H. S. MILLER, *Assistant Examiner.*